United States Patent
Chen et al.

(10) Patent No.: US 8,555,233 B2
(45) Date of Patent: Oct. 8, 2013

(54) INTEGRATED CIRCUIT OPTIMIZATION MODELING TECHNOLOGY

(75) Inventors: Qiang Chen, Cupertino, CA (US); Sridhar Tirumala, Saratoga, CA (US); Akash Jain, Milpitas, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/594,154

(22) Filed: Aug. 24, 2012

(65) Prior Publication Data

US 2012/0324411 A1 Dec. 20, 2012

Related U.S. Application Data

(62) Division of application No. 12/771,754, filed on Apr. 30, 2010, now Pat. No. 8,271,931.

(60) Provisional application No. 61/253,410, filed on Oct. 20, 2009.

(51) Int. Cl.
*G06F 17/50* (2006.01)

(52) U.S. Cl.
USPC .......... 716/132; 716/133; 716/134; 716/136; 703/2

(58) Field of Classification Search
USPC .............. 716/132–134, 136; 703/2
See application file for complete search history.

(56) References Cited

U.S. PATENT DOCUMENTS

| | | | |
|---|---|---|---|
| 6,606,729 B2 * | 8/2003 | Gross et al. ................. 716/50 |
| 7,149,999 B2 | 12/2006 | Kahng et al. |
| 7,155,689 B2 | 12/2006 | Pierrat et al. |
| 7,383,521 B2 | 6/2008 | Smith et al. |
| 7,441,211 B1 | 10/2008 | Gupta et al. |
| 7,730,432 B1 * | 6/2010 | Gupta et al. ................. 716/135 |
| 7,743,349 B2 * | 6/2010 | Gupta et al. ................. 716/136 |
| 8,103,981 B2 * | 1/2012 | Kahng et al. ................. 716/50 |
| 8,271,931 B2 | 9/2012 | Chen et al. |
| 2003/0066034 A1 * | 4/2003 | Gross et al. ................. 716/1 |
| 2006/0150132 A1 | 7/2006 | Gupta |
| 2008/0141190 A1 * | 6/2008 | Jung et al. ................. 716/4 |
| 2008/0195359 A1 * | 8/2008 | Barker et al. ................. 703/2 |

OTHER PUBLICATIONS

Basu et al., "Variation Aware Spline Center and Range Modeling for Analog Circuit Performance," ISQED 2008, Quality of Electronic Design, pp. 162-167. cited by other.

Borkar et al., "Parameter Variations and Impact on Circuits and Microarchitecture," Proceeding of the Design Automation Conference, Jun. 2-6, 2003, pp. 338-342. cited by other.

Borkar, Shekhar, "Extending and Expanding Moore's Law—Challenges and Opportunities," Intel Corp., Apr. 11, 2006, Slides 1-44. cited by other.

(Continued)

*Primary Examiner* — Naum Levin
(74) *Attorney, Agent, or Firm* — Haynes Beffel & Wolfeld LLP

(57) ABSTRACT

A design optimization method for a target circuit design specified by a machine-readable file, comprises providing a computer-implemented model as a function of a set of characteristics of circuit designs of circuit optimization achievable due to a circuit modification procedure, such as timing constrained gate length modification for leakage power reduction. Using values of said set of characteristics for the target circuit design, the computer-implemented model is applied to the target circuit design to produce an indication of susceptibility of the target circuit design to optimization. The model can be produced using Monte Carlo simulations of a set of virtual designs, and fitting a function of said characteristics to the results.

22 Claims, 6 Drawing Sheets

(56) References Cited

OTHER PUBLICATIONS

Clark et al., "Managing Standby and Active Mode Leakage Power in Deep Sub-micron Design," ISLPED 2004, Proceedings of the 2004 International Symposium on Low Power Electronics and Design, Aug. 9-11, 2004, pp. 274-279. cited by other.

Gupta et al., "Gate-Length Biasing for Runtime Leakage Control," IEEE Trans. on Computer-Aided Design of Integrated Circuits and Systems, vol. 25, No. 8, Aug. 2006, pp. 1475-1485. cited by other.

Gupta et al., "Selective Gate-Length Biasing for Cost-Effective Runtime Leakage Control," Proceedings. 41st Design Automation Conference, Jun. 7-11, 2004, pp. 327-330. cited by other.

Shah et al., "Standard Cell Library Optimization for Leakage Reduction," 43rd ACM/IEEE Design Automation Conference, Jul. 24-28, 2006, pp. 983-986. cited by other.

Sirisantana et al., "High-Performance Low-Power CMOS Circuits Using Multiple Channel Length and Multiple Oxide Thickness," 2000 IEEE, pp. 227-232. cited by other.

Tang et al., "Phenomenological Model for Gate Length Bias Dependent Inverter Delay Change with Emphasis on Library Characterization," ISQED 2009, Quality of Electronic Design, Mar. 16-18, 2009, pp. 303-308. cited by other.

Wei et al., "Low Voltage Low Power CMOS Design Techniques for Deep Submicron ICs," pp. 1-6, IEEE, 2000. cited by other.

* cited by examiner

INTEGRATED CIRCUIT OPTIMIZATION MODELING TECHNOLOGY

REFERENCE TO RELATED APPLICATIONS

This application is a divisional of U.S. patent application Ser. No. 12/771,754 filed on 30 Apr. 2010 (now U.S. Pat. No. 8,271,931 Issued 18 Sep. 2012), which application claims the benefit of U.S. Provisional Application No. 61/253,410, filed 20 Oct. 2009, which applications are incorporated by reference as if fully set forth herein.

BACKGROUND

1. Field of the Invention

The present invention relates to electronic design automation (EDA), and to implementation of changes for elements of integrated circuit designs for performance optimization.

2. Description of Related Art

Integrated circuit design is supported by electronic design automation. One approach to EDA supported design is based on the definition of an integrated circuit using a computer system as a netlist of circuit elements. Also, a cell library is provided for a given technology that includes a cells that can be chosen for use in a physical implementation of the circuit elements in the netlist. The cell library has a finite number of choices for the circuit elements, as each cell in the library is pre-qualified for manufacturability and other factors. To implement the netlist, cells are selected from the library, placed in a layout space, and interconnections are defined among the cells. The selection of cells, placement of cells and defining interconnections among the cells can be referred to as placement and routing. The result is a layout file which specifies the shapes and locations of components of the cells, and the interconnections of the cells which are to be made into an integrated circuit in a foundry.

It has been shown that small layout changes, such as transistor gate length increases, can be used to optimize integrated circuits for performance, leakage power, etc. (See, Clark, et al., "Managing Standby and Active Mode Leakage Power in Deep Sub-micron Design," In Proc. ISLPED (Newport, Calif., Aug. 9-11, 2004), 274-279).

Transistors with above-nominal gate lengths have been proposed and used in VLSI designs to reduce the active mode leakage power (i.e., runtime leakage). See, Puneet Gupta et al. "Selective gate-length biasing for cost-effective runtime leakage control," Proceedings of the 41st Design Automation Conference, 2004 (Gupta 1); Shekhar Borkar et al., "Parameter variations and impact on circuits and microarchitecture" Proceeding of the Design Automation Conference, 2-6 Jun. 2003; Qian Ying Tang, et al. "Phenomenological model for gate length bias dependent inverter delay change with emphasis on library characterization," ISQED 2009, Quality of Electronic Design, 16-18 Mar. 2009; and Puneet Gupta et al., "Gate-length biasing for runtime-leakage control," IEEE Transactions on Computer-Aided Design of Integrated Circuits and Systems, vol. 25, Issue 8, August 2006 (Gupta 2).

Gate length biasing can be implemented either on the cell level or on the transistor level. See, Tang; Gupta 2; Saumil Shah, et al., "Standard cell library optimization for leakage reduction," Design Automation Conference, 2006 43rd ACM/IEEE; and Lawrence T. Clark et al., "Managing Standby and Active Mode Leakage Power in Deep Sub-micron Design," ISLPED 2004, Proceedings of the 2004 International Symposium on Low Power Electronics and Design, 2004. The resulting lower-performance, lower-leakage standard cell variants are then exploited to replace as many cell instances as possible on design paths with positive timing slack (Gupta 2).

The value(s) of the gate length bias are usually chosen to ensure footprint equivalence and complete interchangeability between cell masters and cell variants, and the number of allowable biases may vary. For example, the dual-gate-length (DGL) approach allows the nominal gate length and one bias only. The multi-gate-length (MGL) technique, however, can use many bias values with fine increments on the cell level. MGL, similar to the within-cell transistor-level biasing, results in finer levels of granularity in delay-leakage trade-off on the cell level. Intuitively, finer levels of granularity could translate into better leakage reduction on the design level, in part by moving timing paths closer to the guard-banded zero slack timing point. Previous studies, however, reported inconsistent findings, with some showing noticeable additional leakage reduction and others observing very little advantage by using finer levels of granularity.

Procedures used to implement these small changes can be very expensive, in terms of computing resources and time required to carry them out. Also, the procedures applied to optimize circuit designs using these techniques can achieve improvements only in some circuit designs. So, the decision to implement these modification procedures to optimize a circuit characteristic can cost substantial delay and computing resources, while yielding benefits in only some cases. Also, making a best choice between alternative modification procedures can result in substantial savings in the design process.

It is desirable therefore to provide design automation tools that enable designers to predict the benefits of applying constrained optimization procedures, before committing expensive resources to carrying them out.

SUMMARY

A modeling methodology and analytical model are described for use in integrated circuit design optimization. A computer implemented model is provided which predicts susceptibility of designs to constrained optimization as a result of a circuit modification procedure. The modifications applied can comprise changes to the design that can improve a given characteristic such as leakage power at the expense of another characteristic such as delay. The model provided is a function of a set of characteristics of circuit designs that correlate with the results due to the circuit modification procedures for the constrained optimization. The model is applied for a target circuit design by determining values of the set of characteristics, and applying the computer implemented model to produce an indication. The indication can indicate the susceptibility of the target design to optimization by a procedure implementing the circuit modification. The circuit modification procedure in an embodiment described here comprises timing constrained, leakage power reduction, which can be achieved by gate length adjustments or other modifications to the target circuit design. The characteristics of the circuit design can include design level characteristics, such as logic depth and slack, and cell instance level characteristics such as cell power sensitivity to gate length adjustments and cell delay sensitivity to gate length adjustments.

A determination can be made based on the indication whether to apply the circuit modification procedure, or whether to apply one or another alternative circuit modification procedure. The determination can be made automatically by computer implemented logic, or by the designer in response to the indication. The indication can be presented to the designer using a graphical user interface in the EDA computer system, or otherwise.

The computer implemented model of circuit optimization can comprise a function derived from a Monte Carlo data set of the results of simulations of the circuit modification procedure over a set of virtual circuit designs. Virtual circuit designs can be created that represent circuits having values for the set of characteristics that fall within the mean and standard deviation for representative circuit designs created using the target technology. Using the Monte Carlo data set resulting from the simulations, a curve-fitting analysis or other type of analysis of the data set, can be used to produce the computer implemented model.

A data processing system is described that is adapted for performing the processes outlined above.

An article of manufacture is described which comprises a machine readable data storage medium storing instructions executable by a processor adapted for performing the processes outlined above.

An article of manufacture is described which comprises a machine readable data storage medium storing a layout file, which is produced according to the processes described above, and in which shapes and locations of multiple layers of the cells selected for implementation, and of interconnect structures for connecting the cells, are specified for the lithographic masks and integrated circuit structures to be manufactured are defined.

Other aspects and advantages can be seen on review of the drawings, the detailed description and the claims, which follow.

DETAILED DESCRIPTION

A detailed description of embodiments of the present invention is provided with reference to the FIGS. 1-7.

Figure 1:
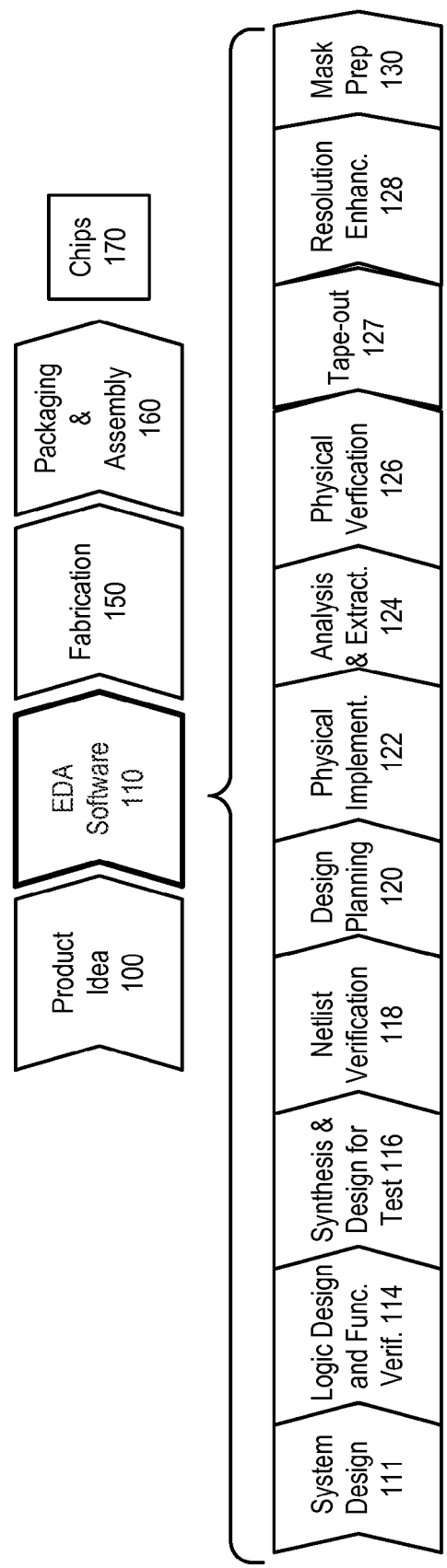
FIG. 1 is a simplified representation of an illustrative integrated circuit design flow, in which shape modifications after place and route operations as described here can be employed.

FIG. 1 is a simplified representation of an illustrative integrated circuit design flow. As with all flowcharts herein, it will be appreciated that many of the steps of FIG. 1 can be combined, performed in parallel or performed in a different sequence without affecting the functions achieved. In some cases a rearrangement of steps will achieve the same results only if certain other changes are made as well, and in other cases a rearrangement of steps will achieve the same results only if certain conditions are satisfied. Such rearrangement possibilities will be apparent to the reader.

At a high level, the process of FIG. 1 starts with the product idea (block 100) and is realized in an EDA (Electronic Design Automation) software design process (block 110). When the design is finalized, the fabrication process (block 150) and packaging and assembly processes (block 160) occur, ultimately resulting in finished integrated circuit chips (result 170).

The EDA software design process (block 110) is composed of a number of steps 111-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (block 110) will now be provided.

System design (block 111): The designers describe the functionality that they want to implement, they can perform what-if planning to refine functionality, check costs, etc. Hardware-software architecture can occur at this stage. Example EDA software products from Synopsys, Inc. that can be used at this step include Model Architect, Saber, System Studio, and DesignWare® products.

Logic design and functional verification (block 114): At this stage, high level description language (HDL) code, such as the VHDL or Verilog code, for modules in the system is written and the design is checked for functional accuracy. More specifically, the design is checked to ensure that it produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (block 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Compiler, FPGA Compiler, TetraMAX, and DesignWare® products.

Netlist verification (block 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (block 120): Here, an overall floor plan for the chip is constructed and analyzed for timing and top-level routing. Example EDA software products from Synopsys, Inc. that can be used at this step include Astro and IC Compiler products.

Physical implementation (block 122): The placement (positioning of circuit elements) and routing (connection of the same) occurs at this step. Example EDA software products from Synopsys, Inc. that can be used at this step include AstroRail, Primetime, and Star RC/XT products. The modification procedures for constrained circuit optimization and analysis technologies described herein can be implemented at this stage of the process, and can be provided as a function in or supporting IC Compiler for example.

Analysis and extraction (block 124): At this step, the circuit function is verified at a transistor level, this in turn permits what-if refinement. Example EDA software products from Synopsys, Inc. that can be used at this stage include Astro-Rail, PrimeRail, Primetime, and Star RC/XT products.

Physical verification (block 126): At this stage various checking functions are performed to ensure correctness for: manufacturing, electrical issues, lithographic issues, and circuitry. Example EDA software products from Synopsys, Inc. that can be used at this stage include the Hercules product.

Tape-out (block 127): This stage provides the "tape-out" data for production of masks for lithographic use to produce finished chips. Example EDA software products from Synopsys, Inc. that can be used at this stage include the CATS(R) family of products.

Resolution enhancement (block 128): This stage involves geometric manipulations of the layout to improve manufacturability of the design. Example EDA software products from Synopsys, Inc. that can be used at this stage include Proteus/Progen, ProteusAF, and PSMGen products.

Mask preparation (block 130): This stage includes both mask data preparation and the writing of the masks themselves. Example EDA software products from Synopsys, Inc. that can be used at this stage include CATS(R) family of products.

Figure 2:
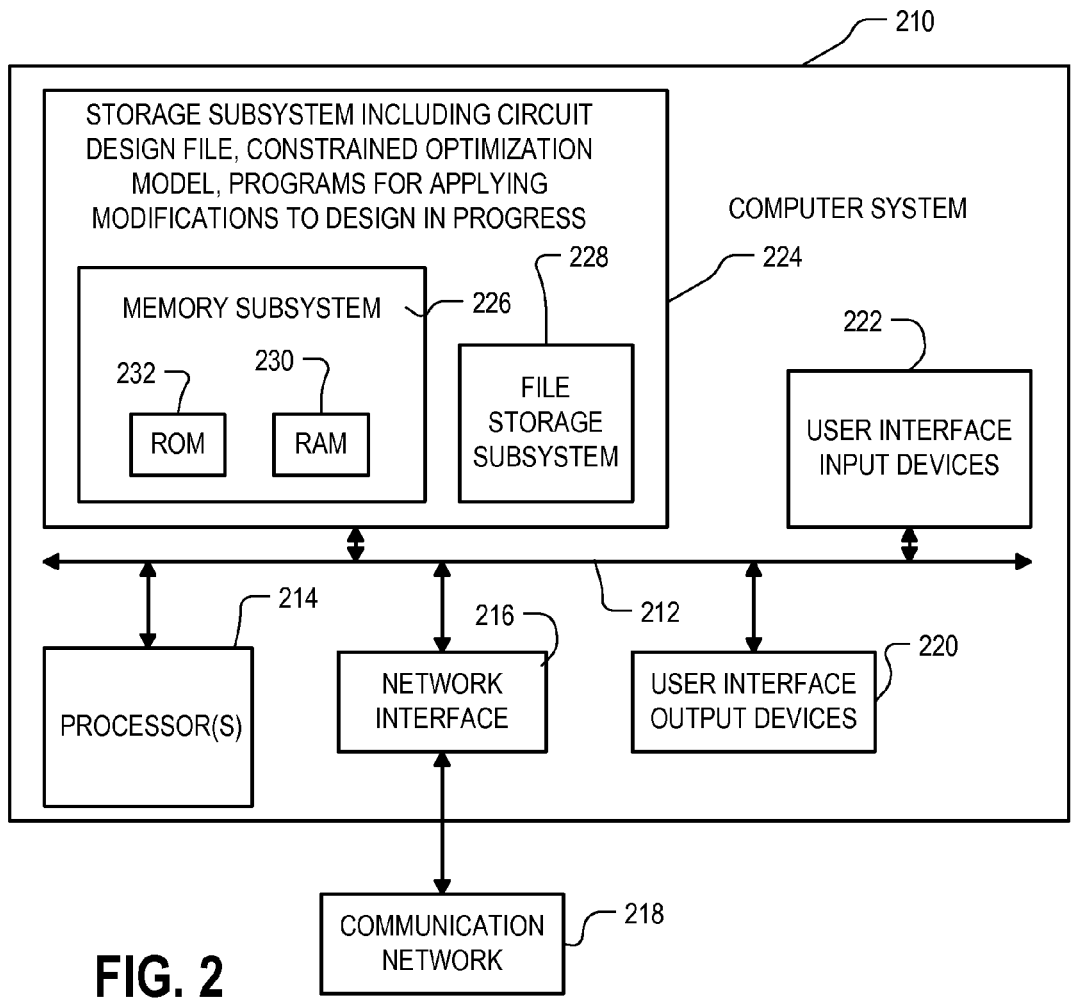
FIG. 2 is a simplified block diagram of a data processing system suitable for the operations described herein.

FIG. 2 is a simplified block diagram of a computer system 210 suitable for use with embodiments of the technology. Computer system 210 typically includes processor(s) 214 which communicates with a number of peripheral devices via bus subsystem 212.

The peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210, and typically include a graphical user interface. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image and supporting a graphical user interface usable by a designer. The display subsystem may also provide non-visual display such as via audio output devices. In general, use of the term "output device" is intended to include all possible types of devices and ways to output information from computer system 210 to the user or to another machine or computer system.

Storage subsystem 224 stores the basic programs of instructions and data constructs that provide the functionality of some or all of the EDA tools described herein, including the software modules for standby power optimization as described herein. These software modules are generally executed by processor(s) 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 228. The shared memory of a multicore processor can be separate from the storage subsystem or part of it, depending on the architecture deployed.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Figure 2A:
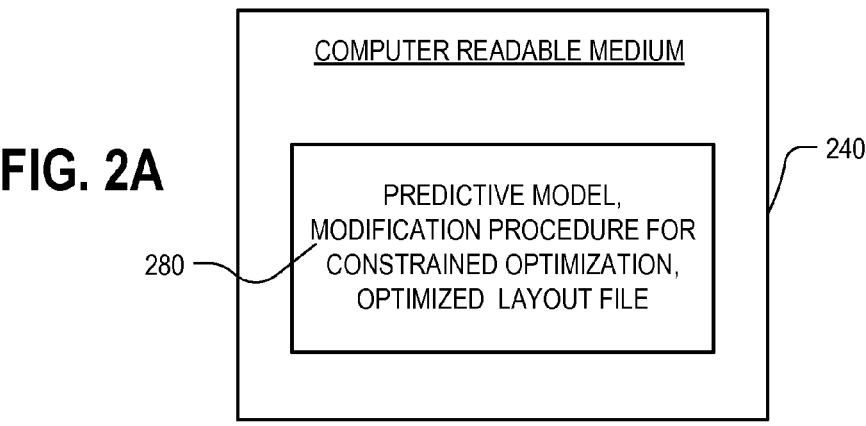
FIG. 2A is a simplified block diagram of a machine readable data storage medium storing data structures as described herein.

FIG. 2A shows an article of manufacture comprising a computer readable medium 240, which can be a medium associated with, or included in, file storage subsystem 228, and/or with network interface subsystem 216. The computer readable medium 240 can be a hard disk, a floppy disk, a CD-ROM, an optical medium, removable media cartridge, a tape drive, flash memory or other data storage medium on which instructions executable by a computer are stored for distribution and/or safekeeping. The computer readable medium 240 stores data structures and executable files 280 used for implementation of the technology described herein, including a program for constrained optimization of a circuit characteristic by applying a circuit modification procedure and a computer implemented model for predicting susceptibility of a target design to improvement by the circuit modification procedure. The computer readable medium 240 stores a layout file which is produced according to the processes described above, and in which shapes and locations of multiple layers of the cells selected for implementation, and of interconnect structures for connecting the cells, are specified for the lithographic masks and integrated circuit structures to be manufactured are defined for use by machines implementing such masks and integrated circuits.

The description of computer system 210 depicted in FIG. 2 is intended only as a specific example for purposes of illustrating the preferred embodiments. Many other configurations of computer system 210 are possible having more or less components than the computer system depicted in FIG. 2. The computer system 210 in some embodiments includes a number of stations, each of which can have the components illustrated in FIG. 2, in a distributed architecture or in a server farm arrangement, for performing convolutions over many large layouts and many kernels.

The system includes a computer implemented model, which characterizes the susceptibility of the design to improvements by constrained optimization techniques, in response to operative characteristics of a circuit design. The model can be produced by defining a plurality of virtual circuits and virtual or real technology files, performing Monte Carlo simulations of the constrained optimization processes for many of such virtual circuits over combinations of operative characteristics, and producing a model that matches the results.

The system includes a database storing a file specifying a circuit design, such as a list of cells or cell instances that define the circuit in a placed and routed design specified, for example using a tool such as IC Compiler. The database can include a design description expressed in VHDL, such as Verilog, a standard cell library used for the design, a technology file describing interconnect used in the circuit, and a design constraint file, specifying timing, capacitance, operating frequency and so on.

The system includes a computer program to analyze the circuit design using the file to characterize the design to determine operative characteristics for the model.

The system includes a computer program to apply the model using the operative parameters of the design to produce an output indicating the susceptibility of the design to improvements by leakage power optimization processes subject of the model.

Operative characteristics of a circuit design for a model to predict improvements likely in gate length biasing processes, or other threshold voltage adjustment processes, for timing constrained, leakage power optimization in an example described here include: logic depth—number of stages in a timing path; starting slack; leakage power sensitivity of cell instances to change, e.g. in gate length, in threshold voltage Vt, etc.; and delay sensitivity of cell instances to change. In another mode, rather than predicting improvements likely using a particular adjustment process, the model can be used to predict relative performance of alternative adjustment processes, such at the DGL and MGL processes mentioned above.

Figure 3:
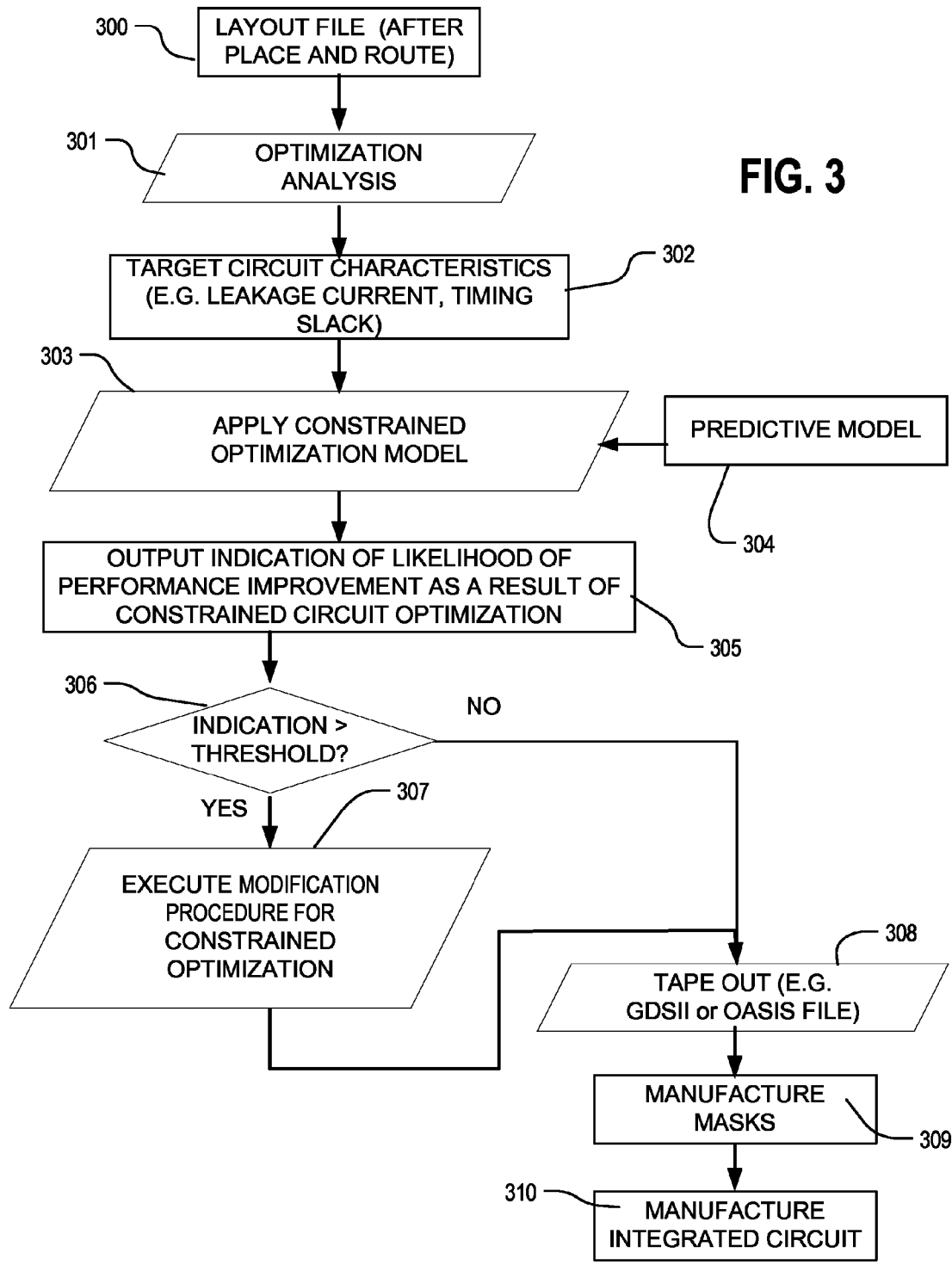
FIG. 3 is a flow chart of an EDA design process applying a computer implemented model to produce an indication of susceptibility of the target design to optimization.

FIG. 3 is a simplified flowchart for the EDA process described herein. This flowchart begins with input of the layout file after place and route (300). The layout file can have a hierarchical structure in which shapes and locations of multiple layers of the cells selected for implementation and of interconnect structures for connecting the cells are specified for the integrated circuit structure to be manufactured. After place and route, the layout file is submitted for optimization analysis (301). The optimization analysis includes, among other processes, extraction of parasitic capacitance and resistance and re-computation of timing performance of the design using the extracted parameters and information from the cell library for cells used in the layout file. As a result of the optimization analysis, characteristics of the design, including leakage power, timing slack and so on are available. Using the information from the optimization analysis, an operative set of characteristics of the target circuit design are identified, including logic depth, delay sensitivity of cells in the design to gate length adjustment, and leakage power sensitivity of cells in the design to gate length adjustment (302).

Given the characteristics of the target circuit design, a prediction is made of the benefits possible were a circuit modification procedure applied to implement a constrained optimization of the target design (303), using a pre-defined predictive model 304. The pre-defined predictive model produces information about the amount of optimization, in this case timing constrained leakage power reduction, likely to be possible for the target circuit design. The information about the amount of optimization likely derived from the model indicates susceptibility of the target design to improvement by a selected circuit modification procedure or class of procedures. The information can be output as an indication of such likelihood (305), by presenting the information, a summary of the information or an icon derived from the information, for example, on a graphical user interface on the EDA computer system accessible by the designer. The designer can make a determination of whether the indication suggests that applying the selected circuit modification procedure for timing constrained leakage power reduction would yield useful results. Alternatively, the indication can be utilized by a computer program to determine automatically whether to initiate the circuit modification procedure. So, the indication can be compared to a threshold or otherwise evaluated (306). If the determination is made, either by a designer or automatically by the machine, to proceed with the constrained optimization, then the circuit modification procedure is executed (307), and the resulting file is provided to a tape out process (308). If the determination is made that the circuit modification procedure is unlikely to result in significant improvement, then the layout file is provided to the tape out process (308) without such modifications. In an alternative procedure, the modified layout file can be analyzed again to verify timing and so on, before being provided to the tape out process (308).

The manufacturing process proceeds with tape out (308) according to the processes described above. As a result of the tape out process, a tape out file is generated and stored on a machine readable storage device as shown in FIG. 2A, in which the target design is specified using a layout format language such as GDSII or the Open Artwork System Interchange Standard (OASIS) suitable for use by the manufacturer. Accordingly, a tape out file is provided that specifies layout of a target circuit design having been optimized according to the procedure described above.

Next, masks are manufactured to be used in the manufacturing process, typically after optical proximity correction (309). Accordingly, a mask set is provided for a target circuit design having been optimized according to the procedure described above. Finally, the integrated circuit is manufactured utilizing the masks (310). Accordingly, an integrated circuit is provided, for a target circuit design having been optimized according to the procedure described above.

One example of constrained circuit optimization described herein is leakage power reduction constrained by circuit timing characterized by slack. Optimization of a design for leakage power involves the constrained maximization of the objective function, where the objective function is the difference of initial leakage power and resulting leakage power, and the constraint is the maximum allowed delay increase for a given path given the initial slack on the path. The objective function can be maximized incrementally, where each step consists of a drive strength adjustment such as a gate length change for a single cell instance and is guided by the cell delay and power sensitivity of the design. The stopping criterion for the optimization is achieved when the maximum allowed delay increase is violated. The maximum allowed delay increase can be specified as that delay increase which does not consume all of the available slack within acceptable margin.

Figure 4:
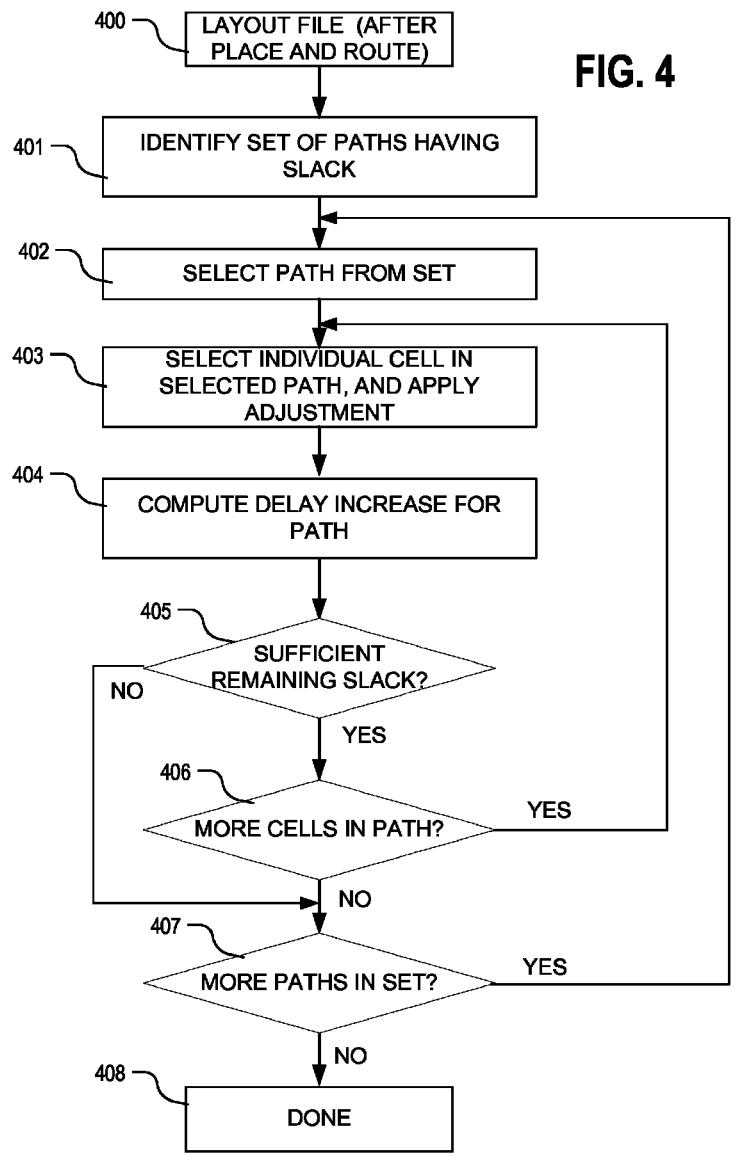
FIG. 4 is a flow chart for a procedure to apply timing constrained gate length adjustments for leakage power optimization.

FIG. 4 is a simplified flowchart for a timing constrained leakage power optimization, using a procedure such as gate length adjustment. In the process shown in FIG. 5, layout file 400 is provided. Next, the process identifies a set of paths in the layout file which have available timing slack (401). The process selects a path from the set (402). Next, the process selects an individual cell in a selected path and applies the adjustment (403). The delay increase as a result of the adjustment is computed for the path (404). Next, the process determines whether there is sufficient remaining slack to proceed with additional adjustments along the path (405). If there is sufficient remaining slack, the process determines whether there are more cells in the path to which the adjustment can be applied (406). If there are additional cells to which the adjustment can be applied, then the algorithm loops back to step 403 to select the next cell. If there are no additional cells in the path at step 406, or if it is determined that there is not sufficient remaining slack at step 405, then the process determines whether there are additional paths in the set (407). If there are additional paths in the set, then the process loops to step 402 to select the next path. If all the paths have been processed at step 407, then the procedure is done (408). As can be understood, a process which walks individual cells in a large circuit design, such as a constrained optimization process as described above, can consume significant computing resources, taking days to complete in some situations.

Figure 5:
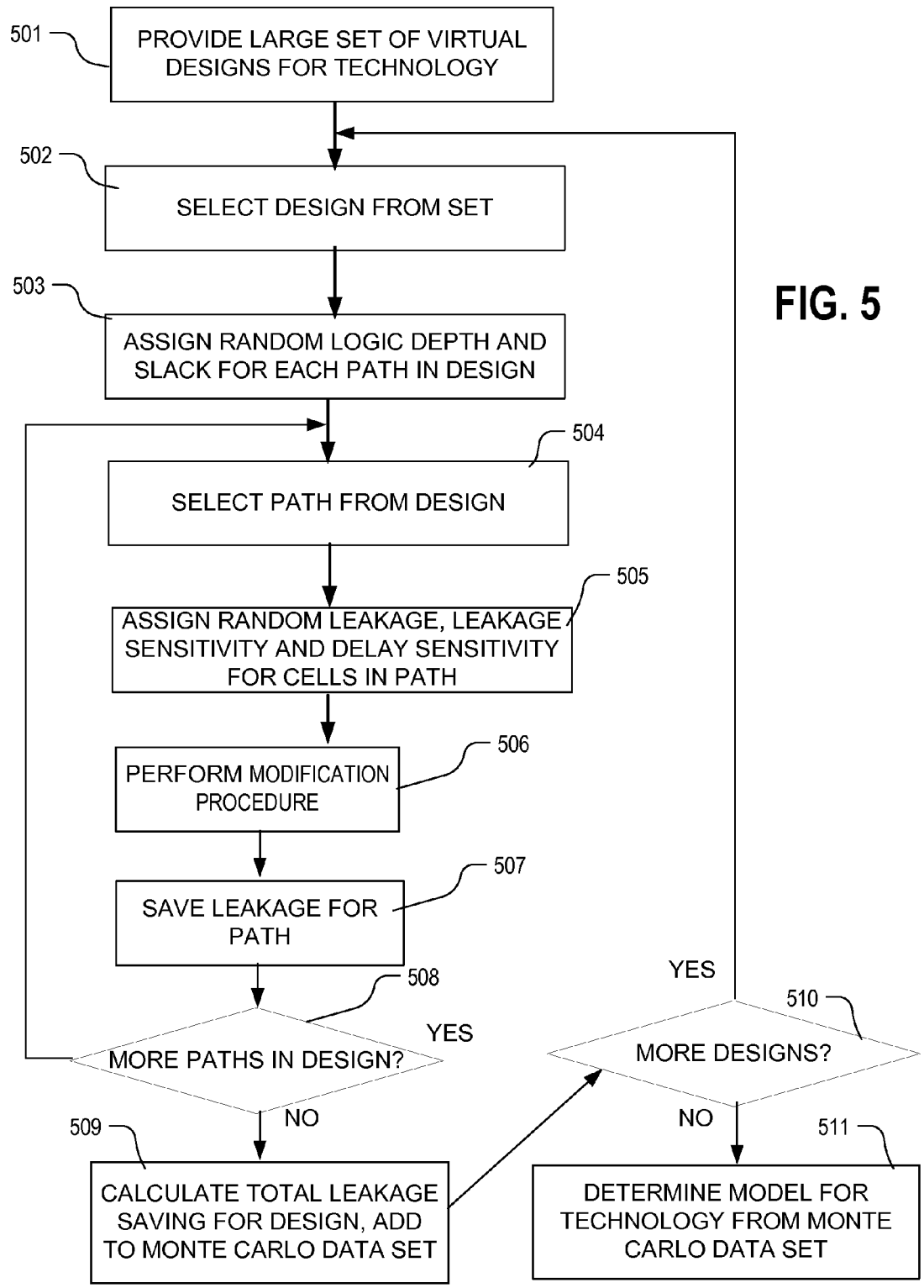
FIG. 5 is a flow chart for a procedure to implement a predictive model of susceptibility of a target design to constrained circuit optimization.
Figure 6:
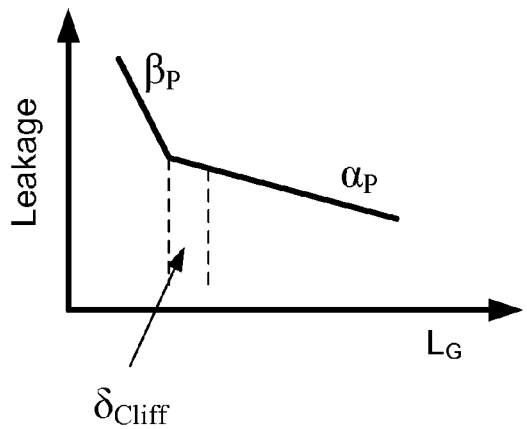
FIG. 6 is a graph showing leakage power sensitivity to gate length change, as a function of gate length.

FIG. 5 is a simplified flowchart illustrating a technique for producing a computer implemented, predictive model for use in determining whether a constrained optimization, such as timing constrained gate length adjustment for leakage power optimization, is likely to yield a good result as applied to a target circuit design. The process basically involves generating a Monte Carlo data set by applying the constrained circuit optimization process to a large number of virtual designs, and creating a model based on analysis of the Monte Carlo data set with respect to an operative set of characteristics of the design that correlate with the optimization process.

In the flowchart shown in FIG. 5, the process begins with providing a large set of virtual designs for a given technology (501). For example, a set of virtual designs may include about 3000 designs, where the designs can be characterized by a mean and standard deviation of characteristics used for making a prediction. In this example where gate length adjustments are being applied for leakage power optimization, the characteristics include logic depth, slack, cell leakage, cell leakage sensitivity to gate length adjustment, and cell delay sensitivity to gate length adjustment. Each of the designs has a minimum number of paths specified, where the number depends upon statistical analysis of the feature being optimized. For gate length adjustment, it is found that using virtual designs having about 1000 paths can be sufficient.

Practical values for the set of operative characteristics that correlate with leakage reduction by gate length adjustments can be derived by analysis of a number of industrial circuit design and standard cell libraries. Values of each characteristic form a certain distribution, and the distribution itself, that is its mean and variance, may change from one design to another, or from one technology to another.

Data mining results from an exemplary technology are presented in the following table, and can be applied for simulations.

TYPICAL VALUES AND DISTRIBUTION OF
CHARACTERISTICS EXTRACTED FROM
DESIGNS AND TECHNOLOGIES

| Char. | Unit | Dist. | Var. | Mean | Std. Dev. |
|---|---|---|---|---|---|
| P | W | Log-norm | $\log_{10}P$ | $-9 \ldots -7$ | $0.35 \ldots 0.45$ |
| $\alpha_P$ | dec/nm | Log-norm | $\log_{10}\alpha_P$ | $-1.8 \ldots -1.2$ | $0.25$ |
| $\alpha_D$ | ps/nm | Log-norm | $\log_{10}\alpha_D$ | $-0.1 \ldots -0.3$ | $0.2 \ldots 0.3$ |
| S | Ps | Log-norm | $\log_{10}S$ | $1 \ldots 3$ | $0.1 \ldots 0.7$ |
| $L_D$ | n/a | normal | $L_D$ | (5, 1.5), (15, 4), (25, 2) | |

In which,
P: log10 leakage Power in Watts
$\alpha_P$: log10 power sensitivity in decrease per nanometer
$\alpha_D$: log10 delay sensitivity in picoseconds per nanometer
S: log10 starting timing slack in picoseconds
$L_D$: Logic depth Given a set of virtual designs, a specific virtual design is selected from the set (502). Alternatively, the virtual designs can be created one at a time. For each path in the selected design, a random logic depth and slack are assigned, within the mean and standard deviation specified for the virtual designs (503). Next, an individual path is selected within the selected design (504). For each cell in the selected path, random leakage, leakage sensitivity and delay sensitivity values are assigned, within the mean and standard deviation specified for the virtual designs (505). Using randomized characteristics for the selected path, the timing constrained gate length optimization process is applied (506). Next, the results of the optimization are saved for the selected path (507). The procedure illustrated in FIG. 5 next determines whether there are more paths in the selected design (508). If not, then the total leakage saving for the design is calculated and added to a Monte Carlo data set being developed for the large set of virtual designs for the technology. If at step 508 there are more paths to be analyzed in the design, then the procedure loops back to step 504 until all of the paths from the selected virtual design have been analyzed. At step 509, if an analysis of a selected virtual design has been completed, the procedure determines whether there are more designs in the set yet to be analyzed (510). If there are more designs to be analyzed, and the process loops to step 502 to select the next design. If at step 510, all of the designs have been analyzed, then the Monte Carlo data set can be analyzed to determine a model for the specific technology (511).

Pseudocode for Monte Carlo simulations of leakage reduction biasing for a set of virtual designs is set forth below.

procedure DesignOptimizer
1. forall paths
2.     Randomly assign logic depth with $(\mu_{LD}, \sigma_{LD})$
3.     Randomly assign starting slack with $(\mu_{log10(S)}, \sigma_{log10(S)})$
4.     forall cells in a path
5.         Random cell leakage with $(\mu_{log10(P)}, \sigma_{log10(P)})$
6.         Random leakage sensitivity with $(\mu_{log10(\alpha_P)}, \sigma_{log10(\alpha_P)})$
7.         Random delay sensitivity with $(\mu_{log10(\alpha_D)}, \sigma_{log10(\alpha_D)})$
8. Leakage power ← Optimization (e.g., DGL or MG)
procedure LeakageReductionExplorer
1. forall combinations of $(\mu, \sigma)$ of $L_D$, $\log_{10}(S)$, $\log_{10}(P)$, $\log_{10}(\alpha_P)$, $\log_{10}(\alpha_D)$
2.     Leakage reduction ← DesignOptimizer As seen in the pseudocode, in a first process named DesignOptimizer many combinations of mean and standard deviation of the above identified operative characteristics are created based on their values, such as the values in the table above, to emulate possible interaction between design and technology. For each combination, a virtual design is constructed where the logic depth and starting timing slack of each path is randomly generated, and each cell instance within a path in turn obtains randomly generated values for its leakage power P, power sensitivity $\alpha_P$ and delay sensitivity Up based on their respective distributions. The virtual design is then optimized using a selected circuit modification procedure, such as dual gate length DGL or multiple gate length MGL biasing techniques independently, and the final full-chip leakage power is recorded and compared with the original power. The second process called LeakageReductionExplorer accumulates the results generated by calling the DesignOptimizer of a large number of virtual circuits having combinations of the mean and variance of the characteristics being analyzed, to form the Monte Carlo data set, from which the predictive model is derived.

A model can be derived from the Monte Carlo data set by defining the form of a function that multiplies linear factors corresponding to each operative characteristic used for the model. Given the function, and the data set, the coefficients of the function are manipulated to fit the curve to the data. For a fixed gate length adjustment optimization process, such as the DGL mentioned above for a gate length adjustment $\delta_L$ (nm), a model has been developed based on a Monte Carlo data, as follows:

$$y = e^{-.24\delta_L+1.24} f_{CD}(1.76e^{.845S_P} - .225)(-3.21e^{-.516S_S} + 2.58) \quad \text{Equation (1)}$$

$$\frac{(1.26k_{LD}e^{-.0838N_{LD}} + .55)}{.45k_{LD} + .55} \frac{(-1.35k_{SD}S_D + .73)}{.27k_{SD} + .73}$$

where,
$S_P$: mean of $\alpha_P$;
$S_S$: mean of S;
$N_{LD}$: mean of $L_D$;
$S_D$: mean of $\alpha_D$
$f_{CD}$: fitting factor based on critical dimensions (e.g. maximum gate length after adjustment) in technology
$k_{LD}$: fitting factor based on logical depth in technology
$k_{SD}$: fitting factor based on typical gate delay sensitivity in technology Thus a verification process can be applied for an optimization algorithm which effectively identifies information relevant to the target optimization, which in the example described herein is leakage reduction. The information includes path-level characteristics (logic depth and starting timing slack) as well as cell instance-level characteristics (cell leakage, delay sensitivity and leakage sensitivity of each cell instance). While path-level characteristics are largely design specific, cell instance-level characteristics depend on the design through instance-specific input slew and load capacitance, as well as on the manufacturing technology for which the cell library has been created. Knowledge of the characteristics which correlate with the optimization process along and of the fact that no logic restructuring in the design is needed for the constrained optimization algorithm, makes it possible to construct virtual designs of different styles and virtual technologies for extensive study. A number of other issues, such as crosstalk, are also important to actual implementation of a leakage optimization algorithm. Characteristics that account for such other issues can be added to the virtual designs as appropriate for a given implementation.

The model derived can be applied in the process described with reference to FIG. 3 to predict the value of constrained circuit optimization for a target circuit under design.

This procedure can also be applied to produce a comparative model for use in deciding which alternative circuit modification procedure to apply. For example, the model can be derived based on applying dual gate length DGL modifications, where a single gate length adjustment is available to be used in the modification process, and based on applying multi-gate length MGL modifications, where multiple gate length adjustments are available. The Monte Carlo data set can include information about the differences between the leakage reductions possible in the virtual design according to the two modification processes. A curve fitting procedure can be applied to the Monte Carlo data set of the differences to provide a model for determining the relative advantage of the two modification processes.

Some issues can be eliminated when making comparative models. For example, in a model used to choose between multiple gate length and dual gate length optimization, crosstalk can be ignored. For a comparative model between fixed gate length adjustment modification process, such as the DGL, and multiple gate length or dynamic gate length adjustment has been developed for an exemplary technology based on a Monte Carlo data set, as follows:

$$y=3.15e^{-2.94S_S}(19e^{3.141S_P}+0.77)(2.5791S_D+1.5157) \quad \text{Equation (2)}$$

where,
$S_P$: mean of $\alpha_P$;
$S_S$: mean of S;
$S_D$: mean of $\alpha_D$

In addition to leakage reduction, gate length biasing may also tighten the leakage distribution as the post-biasing, larger gate length(s) are closer to the flatter region of the Vt vs. $L_G$ curve. Two parameters, $\delta_{Cliff}$ and $\beta_P$, can further quantify the cell leakage vs. $L_G$ dependence as shown in the graph in FIG. 6. When $L_G$ changes from the nominal value by $\delta_{Cliff}$, the leakage falls into a region of steeper dependence. The change in the dependence is characterized by the slope multiplier $\beta_P$. The slope multiplier $\beta_P$ along with power sensitivity $\alpha_P$ are determined by short-channel effects and halo doping, whereas $\delta_{Cliff}$ is usually chosen by circuit, architecture, and process control considerations.

Quantitatively capturing the cell leakage vs. $L_G$ dependence, the impact of DGL and MGL on both full-chip leakage power and distribution of leakage power can be evaluated using the Monte-Carlo approach. Each instance's actual gate length is determined by the intentional gate length bias dL1 from either DGL or MGL for example, and the random change dL2 from process variation (the standard deviation of the gate length variation is set to 2 nm, $\sigma_{dL2}$=2 nm). The actual instance leakage is calculated, where $\delta_{Cliff}$ can be set to $-2$ nm, and $\beta_P$ takes values for example from 1 to 3 (assumed to be constant for a given technology), and the full-chip leakage is then obtained. The process of randomly assigning dL2 to each instance is repeated 10K times to mimic chip sampling to finally obtain the mean and standard deviation of the full-chip leakage power. These values can be used as a benchmark to determine starting and finishing leakage power for the target design and for virtual designs used for model creation.

Figure 7:
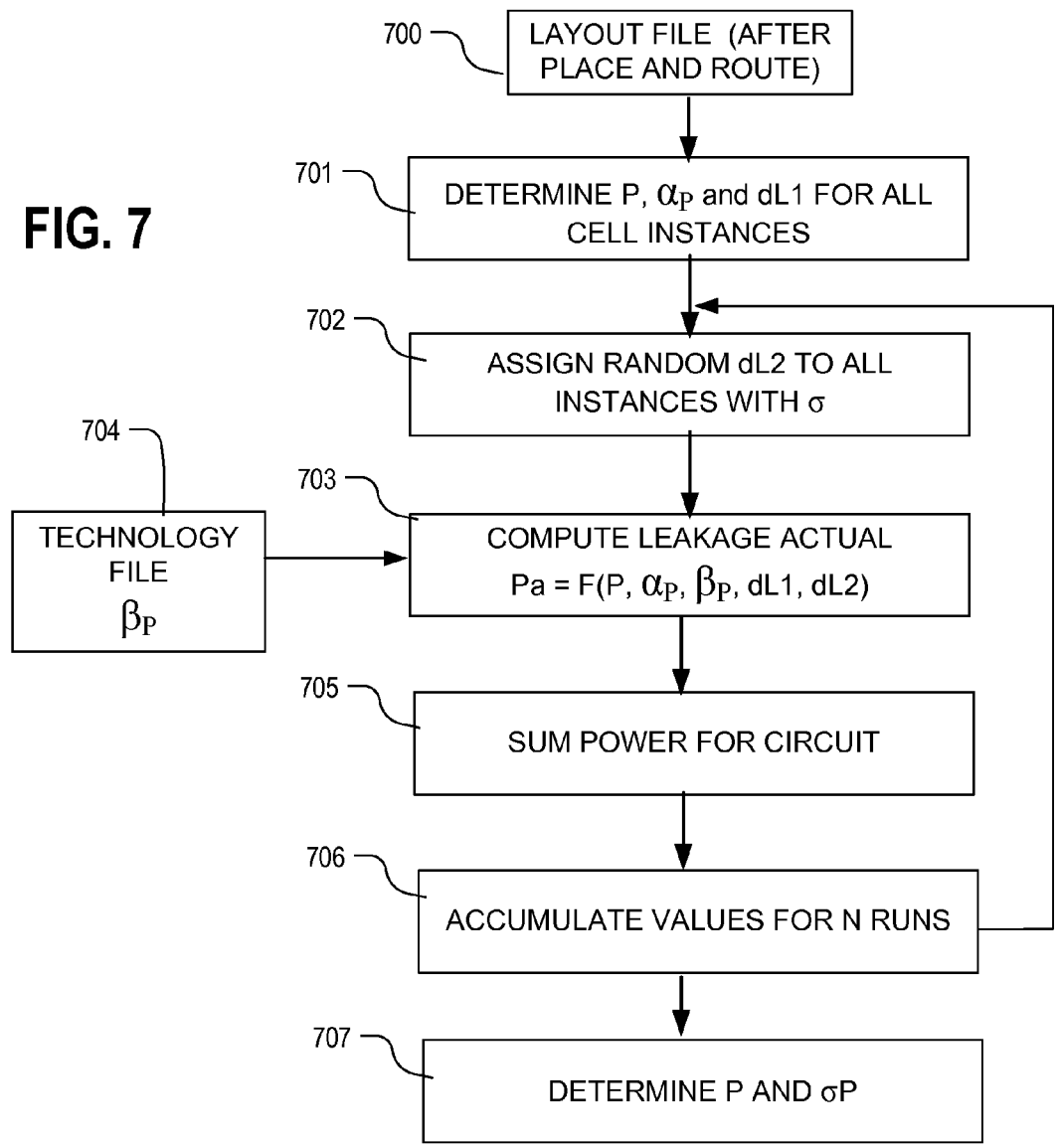
FIG. 7 is a flow chart for a procedure to determine leakage power and variance for a target or virtual circuit design.

FIG. 7 is a simplified flowchart of a process for determining the leakage power and the standard deviation of leakage power of a target design after optimization. In the process shown in FIG. 7, a layout file is provided (700). The leakage power, leakage power sensitivity $\alpha_P$ and gate length adjustment dL1 applied by the optimization are determined for each cell instance (701). Next, a random additional gate length change dL2 is applied to account for process variations as mentioned above, where the value is set to fall within the standard deviation of these variations (702). Next, actual leakage current is calculated for all instances in the target file, where actual leakage power is a function of the original leakage power, leakage power sensitivity $\alpha_P$, the slope multiplier $\beta_P$ derived from the technology file 704, and the gate length modifications which are assigned to the instances (703). Next, the actual power for all of the cell instances is accumulated for the circuit (705). The process is repeated for a large number of cycles, such as about 10,000 cycles, to achieve statistical validity, and the results are accumulated (706). The accumulated values are then processed to determine the mean leakage power and standard deviation leakage power for the circuit (707).

Using this procedure, a constrained gate length modification process and a predictive model can be applied for tightening distribution of leakage current, as well as for leakage reduction.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A design optimization method for reducing leakage power for a target circuit design specified by a machine-readable file, comprising:
providing a computer-implemented model of timing constrained, leakage power reduction achievable by applying gate length modifications to cells in a circuit design as a function of a set of characteristics of circuit designs, the circuit designs including respective pluralities of circuit paths, wherein said set of characteristics includes starting slack, logic depth, power sensitivity to gate length modification and delay sensitivity to said gate length modification;
determining values of said set of characteristics for a target circuit design;
applying the computer-implemented model using said values to produce an indication of susceptibility of the target circuit design to optimization by a procedure to modify said target circuit design using said gate length modifications; and
determining whether to execute the procedure to implement gate length modifications in the target circuit design, in response to the indication.

2. The method of claim 1, including executing a procedure applying gate length modifications in response to said determination.

3. The method of claim 1, wherein said computer-implemented model comprises a function derived from Monte Carlo simulations of results of a procedure to applying gate length modifications for a set of virtual circuit designs.

4. The method of claim 1, wherein said machine-readable file comprises a layout file specifying the target circuit design including a plurality of cells, the layout file specifying shapes of components of the cells, placements of the plurality of cells, and interconnections among the cells, and includes a set of circuit paths.

5. The method of claim 1, including displaying a graphical user interface, and presenting said indication in the graphical user interface.

6. A design optimization method for reducing leakage power for a target circuit design specified by a machine-readable file, comprising:
providing a computer-implemented model of timing constrained, leakage power reduction achievable by applying gate length modifications to cells in a circuit design as a function of a set of characteristics of circuit designs, the circuit designs including respective pluralities of circuit paths;
determining values of said set of characteristics for a target circuit design;
applying the computer-implemented model using said values to produce an indication of susceptibility of the target design to optimization by a procedure to modify said target circuit design using said gate length modifications; and
determining whether to execute the procedure to implement gate length modifications in the target circuit design, in response to the indication.

7. The method of claim 6, including executing a procedure applying gate length modifications in response to said determination.

8. The method of claim 6, wherein said computer-implemented model comprises a function derived from Monte Carlo simulations of results of a procedure to applying gate length modifications for a set of virtual circuit designs.

9. The method of claim 6, wherein said machine-readable file comprises a layout file specifying the target circuit design including a plurality of cells, the layout file specifying shapes of components of the cells, placements of the plurality of cells, and interconnections among the cells, and includes a set of circuit paths.

10. The method of claim 6, including displaying a graphical user interface, and presenting said indication in the graphical user interface.

11. A data processing system adapted for performing a design optimization method for reducing leakage power for a target circuit design specified by a machine-readable file, comprising:
a processor and memory storing a computer-implemented model of timing constrained, leakage power reduction achievable by applying gate length modifications to cells in a circuit design as a function of a set of characteristics of circuit designs including respective pluralities of circuit paths, values of said set of characteristics for the target circuit design, and instructions executable by the processor;
the instructions including logic to apply the computer-implemented model using said values to produce an indication of susceptibility of the target design to optimization by a procedure to modify said target circuit design using said timing constrained, gate length modifications, and logic to determine whether to execute the procedure to implement gate length modification in the target circuit design in response to the indication.

12. The data processing system of claim 11, wherein said set of characteristics includes starting slack, logic depth, power sensitivity to gate length modification and delay sensitivity to said gate length modification.

13. The data processing system of claim 11, wherein the instructions further include logic for executing a procedure applying gate length modifications in response to a determination of whether to execute the procedure to implement gate length modification in the target circuit design.

14. The data processing system of claim 11, wherein said computer-implemented model comprises a function derived from Monte Carlo simulations of results of a procedure to applying gate length modifications for a set of virtual circuit designs.

15. The data processing system of claim 11, wherein said machine-readable file includes a layout file specifying the target circuit design including a plurality of cells, the layout file specifying shapes of components of the cells, placements of the plurality of cells, and interconnections among the cells, and includes a set of circuit paths.

16. The data processing system of claim 11, wherein said instructions further include logic to display the indication in a graphical user interface.

17. An article of manufacture comprising:
a non-transitory, machine readable storage medium storing a computer-implemented model of timing constrained, leakage power reduction achievable by applying gate length modifications to cells in a circuit design as a function of a set of characteristics of circuit designs including respective pluralities of circuit paths, values of said set of characters for a target circuit design, and instructions executable by a processor;
the instructions including logic to apply the computer-implemented model using said values to produce an indication of susceptibility of the target design to optimization by a procedure to modify said target circuit design using said timing constrained, gate length modifications, and logic to determine whether to execute the procedure to implement gate length modification in the target circuit design in response to the indication.

18. The article of manufacture of claim 17, wherein said set of characteristics includes starting slack, logic depth, power sensitivity to gate length modification and delay sensitivity to said gate length modification.

19. The article of manufacture of claim 17, wherein the instructions further include logic for executing a procedure applying gate length modifications in response to a determination of whether to execute the procedure to implement gate length modification in the target circuit design.

20. The article of manufacture of claim 17, wherein said computer-implemented model comprises a function derived from Monte Carlo simulations of results of a procedure to applying gate length modifications for a set of virtual circuit designs.

21. The article of manufacture of claim 17, wherein said machine readable storage medium stores a layout file specifying the target circuit design including a plurality of cells, the layout file specifying shapes of components of the cells, placements of the plurality of cells, and interconnections among the cells, and includes a set of circuit paths.

22. The article of manufacture of claim 17, wherein said instructions further include logic to display the indication in a graphical user interface.

\* \* \* \* \*